United States Patent
Xia et al.

(10) Patent No.: US 6,667,392 B2
(45) Date of Patent: Dec. 23, 2003

(54) POLYMERIC ACETOACETANILIDE AZO COLORANTS

(75) Inventors: Jusong Xia, Moore, SC (US); Eric B. Stephens, Spartanburg, SC (US); Mary G. Mason, Spartanburg, SC (US); John W. Miley, Campobello, SC (US); Leonard J. Starks, Duncan, SC (US); Eugene K. Stephenson, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 148 days.

(21) Appl. No.: 09/994,031

(22) Filed: Nov. 21, 2001

(65) Prior Publication Data

US 2002/0177640 A1 Nov. 28, 2002

Related U.S. Application Data

(60) Provisional application No. 60/253,883, filed on Nov. 29, 2000.

(51) Int. Cl.$^7$ .............................................. C07C 245/08
(52) U.S. Cl. .................. 534/558; 534/573; 534/729; 534/653; 524/190; 524/495; 524/496; 564/248; 564/123
(58) Field of Search ............................... 534/558, 573, 534/729; 524/496, 190, 495; 564/248, 123

(56) References Cited

U.S. PATENT DOCUMENTS

| 4,284,729 A | 8/1981 | Cross et al. ................. 521/158 |
| 4,992,204 A | 2/1991 | Kluger et al. ............ 252/301.16 |

FOREIGN PATENT DOCUMENTS

| JP | 08062836 | | 3/1996 | |
| JP | 408062836 A | * | 3/1996 | ........... G03F/7/004 |

\* cited by examiner

*Primary Examiner*—Yogendra N. Gupta
*Assistant Examiner*—Eisa Elhilo
(74) *Attorney, Agent, or Firm*—Terry T. Moyer; William S. Parks

(57) ABSTRACT

This invention relates to colorants comprising a chromophore having a single azo acetoacetanilide moiety, wherein said moiety each have at least one poly (oxyalkylene) chain. Such colorants exhibit extremely good base stability and lightfastness, particularly when incoporated within certain media and/or on the surface of certain substrates. These poly(oxyalkylene) chains provide solubility in different solvents or resins thereby permitting the introduction of such excellent coloring chromophores within diverse media and/or or diverse substrates. Compositions and articles comprising such colorants are provided as are methods for producing such inventive colorants.

18 Claims, No Drawings

POLYMERIC ACETOACETANILIDE AZO COLORANTS

CROSS REFERENCE TO RELATED APPLICATIONS

This application is based upon provisional application No. 60/253,883 filed on Nov. 29, 2000.

FIELD OF THE INVENTION

This invention relates to colorants comprising a chromophore having a single azo acetoacetanilide moiety, wherein said moiety comprises at least one poly (oxyalkylene) chain. Such colorants exhibit excellent base stability and lightfastness, particularly when incorporated within certain media and/or on the surface of certain substrates. These poly(oxyalkylene) chains provide solubility in different solvents or resins thereby permitting the introduction of such excellent coloring chromophores within diverse media and/or or diverse substrates. Compositions and articles comprising such colorants are provided as are methods for producing such inventive colorants.

DISCUSSION OF THE PRIOR ART

All U.S. patents cited within this specification are hereby incorporated by reference.

Acetoacetanilide azo pigments, dyes, and dyestuffs generally provide effective and desirable colorations to certain substrates, such as textiles, paper, and the like. However, their use is limited to such a narrow range of substrates due to the difficulty of solubility, comparability, and migratory problems inherent with such pigments, dyes, or dyestuffs. Such pigments, dyes, and/or dyestuffs have not been widely introduced as colorants within or on plastics (such as polyolefins, polyurethanes, and the like) due to such physical limitations. However, the utilization of such colorants is highly desired for a number of reasons, foremost the actual colorations available from such specific compounds.

The standard types of polymeric colorants now utilized within plastics (be they thermoplastics or thermoset types) are primarily poly(oxyalkylenated) compounds, such as triphenylmethanes, methines, and the like (i.e., those found within U.S. Pat. No. 4,992,204, to Kluger et al.). Some of these colorants exhibit certain problems in association with the catalysts utilized to effectuate polymer formation. For example, the triphenylmethane and methine moieties of such colorants are susceptible to attack by nucleophilic catalysts and their residues. As a result, the colorations provided by such polymeric colorants may be reduced in strength or changed in shade under such circumstances.

There is thus a desire to introduce such polymeric colorants having acetoacetanilide azo chromophores therein within different types of compositions and therefore a desire to provide an acetoacetanilide-type colorant containing polyoxyalkylene chains that can be tailored for versatility. Furthermore, there is a need to provide a colorant for introduction within thermoplastic and thermoset compositions which is far less susceptible to degradation due to attack by basic catalyst residues than the standard poly (oxyalkylenated) colorants of use today. To date, there have been no teachings or fair suggestions of such a highly desirable, specific colorant-type including at least one acetoacetanilide group within the pertinent prior art or within the colorant industry itself.

DESCRIPTION OF THE INVENTION

It is thus an object of the invention to provide base stable yellow polymeric colorants for utilization within thermoplastic and thermoset articles. Another object of this invention is to provide very bright yellow polymeric colorants which exhibit sharp absorption peaks in comparison with other yellow polymeric colorants. A further object of the invention is to provide an amide-based yellow polymeric colorant that is much less susceptible to attack by basic thermoplastic and thermoset catalysts, is easy to process, mixes well within target plastics, and provides excellent colorations within the target finished articles. Yet another object of this invention is to provide excellent colorations within liquid compositions (such as inks, and the like) through the utilization of water-soluble, liquid polymeric colorants, as noted above.

It is to be understood that the term alkyl as used throughout is intended to encompass any straight or branched alkyl moiety, having anywhere from 1 to 30 carbons therein; the same chain length applies to the term "alkoxy" as well. Also, the term substitued phenyl is intended to encompass any phenyl system having any type of pendant group attached thereto, including, without limitation, alkyl groups, alkylene groups, alcohol groups, ether groups, ester groups, amine groups, amide groups, hydroxyls, and the like. Phenyl is basically an unsubstituted ring system (and thus includes hydrogens only).

The present invention preferably encompasses poly (oxyalkylenated) acetoacetanilide azo colorants, particularly of the structure of Formula (I)

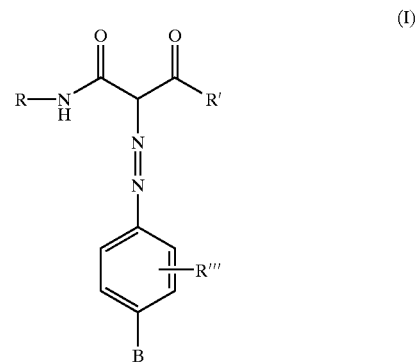

wherein R is phenyl or substituted phenyl, R' is alkyl, phenyl, or substituted phenyl, R''' is H, alkyl, alkoxy, or B, B is R''(gly)$_w$[(EO)$_x$(PO)$_y$(EO)$_z$EG]$_{n''}$, wherein EG is H or a moiety of Structure (II)

wherein $R_4$ is $C_1$–$C_{12}$ alkyl or phenyl; all wherein gly is glycidol, EO is ethylene oxide, and PO is selected from the group consisting of propylene oxide, butylene oxide, or mixtures or combinations thereof, n is 1 to 4, and wherein R" is O, N, $SO_2$, methylene, S, $N(R^5)$, wherein $R^5$ is alkyl or H; wherein if R" is O or $SO_2$ then w=0 or 1, x=0–30, y=0–30, and z=0–30, wherein w+x+y+z>2, and if R" is other than O or $SO_2$, then w=0–2, x=0–30, y=0–30, and z=0–30, wherein w+x+y+z>2.

The present invention also preferably encompasses poly(oxyalkylenated) acetoacetanilide azo colorants of the structure of Formula (III)

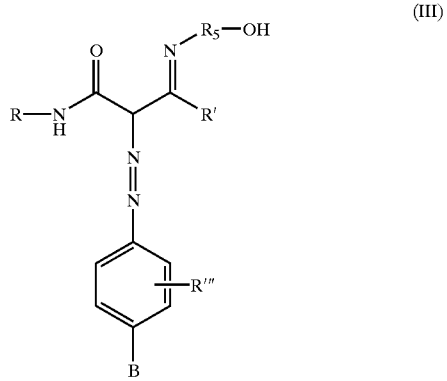

(III)

wherein R is phenyl or substituted phenyl, R' is alkyl, phenyl, or substituted phenyl, R''' is H, alkyl, alkoxy, or B, B is $R''(gly)_w[(EO)_x(PO)_y(EO)_zEG]_{n''}$, wherein EG is H or a moiety of Structure (II)

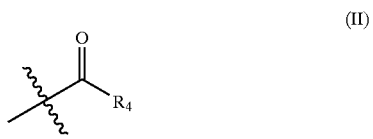

(II)

wherein $R_4$ is $C_1$–$C_{12}$ alkyl or phenyl; all wherein gly is glycidol, EO is ethylene oxide, and PO is selected from the group consisting of propylene oxide, butylene oxide, and any mixtures or combinations thereof, n is 1 to 4, and wherein R" is O, N, $SO_2$, methylene, S, $N(R_5)$, wherein $R_5$ is alkyl or $R_6$—O—$R_7$, wherein $R_6$ and $R_7$ are the same or different and are each individually $C_1$–$C_4$ alkyl; wherein if R" is O or $SO_2$ then w=0 or 1, x=0–30, y=0–30, and z=0–30, wherein w+x+y+z>2, and if R" is other than O or $SO_2$, then w=0–2, x=0–30, y=0–30, and z=0–30, wherein w+x+y+z>2.

Basically, the inventive colorant comprises a chromophore having a single azo acetoacetanilide moiety and at least one poly(oxyalkylene) chain. Such a compound is prepared by diazotizing an aromatic amine compound which comprises such poly(oxyalkylene) chains. Preferably, the poly(oxyalkylene) chains comprise hydroxyl or ester terminal groups capable of reacting with at least a portion of certain monomers which couple with acetoacetanilide or any such derivatives to form the desired polymeric colorant. Such polymeric colorants, which are normally present as liquids, are usually brightly colored greenish yellow, and are much brighter than, show improved base stability, and are extremely lightfast, particularly in comparison with most of the traditional yellow colorants comprising methine or azo groups (specifically those which are polymeric as well). Furthermore, this invention encompasses any article or composition comprising such an inventive colorant or colorants, including, without limitation, liquid marker compositions, waxes, thermoplastics (such as, without limitation, polyolefins, including, again, without limitation, polypropylene), and thermosets (such as, without limitation, polyurethanes, including, again, without limitation, polyurethane foams).

Preferably, the particular oxyalkylene groups are selected from ethyleneoxy (EO), propyleneoxy (PO), and butyleneoxy (BO) groups. Preferably, these moieties are mixtures of EO and PO groups, although combinations of any of these groups may be utilized as well. Preferably, from about 2 to about 300 moles of alkyleneoxy groups are present on each separate polyoxyalkylene pendant group; more preferably from about 2 to 50 moles; and most preferably from about 3 to 30 moles. The term "polyoxyalkylene" is intended to encompass any chain which includes at least two alkyleneoxy groups (whether they are the same or different; e.g., ethyleneoxy and/or propyleneoxy).

The addition of aryloxypolyoxyalkylene groups to the acetoacetamide base compound may be accomplished through the reaction of the aforementioned poly(oxyalkylenated) aromatic amine with a number of different compounds possessing the required acetoacetamide backbone groups. The reactant aromatic amine is introduced in a molar ratio (in comparison with the acetoacetamide base compound) of between about) 0.1:1 to 3:1. Preferably, the reaction is about a 1:1 ratio. The potential standard poly(oxyalkylenated) aromatic amines are numerous and generally comply with the following structure (IV)

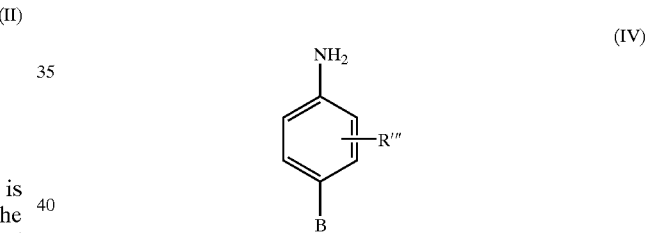

(IV)

wherein R''' is H, alkyl, alkoxy, or B; wherein B is $R''(gly)_w[(EO)_x(PO)_y(EO)_zH]_{n''}$; wherein gly is glycidol, EO is ethylene oxide, and PO is selected from the group consisting of propylene oxide, butylene oxide, and any mixtures or combinations thereof, n is 1 to 4, and wherein R" is O, N, $SO_2$, methylene, S, $N(R_5)$, wherein $R_5$ is alkyl or $R_6$—O—$R_7$, wherein $R_6$ and $R_7$ are the same or different and are each individually $C_1$–$C_4$ alkyl; wherein if R" is O or $SO_2$ then w=0 or 1, x=0–30, y=0–30, and z=0–30, wherein w+x+y+z>2, and if R" is other than O or $SO_2$, then w=0–2, x=0–30, y=0–30, and z=0–30, wherein w+x+y+z>2. Basically, the inventive colorant comprises a chromophore having a single azo acetoacetanilide moiety and at least one poly(oxyalkylene) chain.

The potential inventive acetoacetanilide azo compounds are thus represented by the Structures (I) and (II), above.

The presence of surfactants, solvents, etc., may be utilized to alter the solubility, coloring characteristics, and the like, of the ultimate poly(oxyalkylenated) acetoanilide azo compounds which would be understood and appreciated by the ordinarily skilled artisan within this particular art.

Preferably, the colorant compound (I) is liquid in nature at ambient temperature and pressure and at substantial purity; however, pasty or waxy colorants are also encompassed within this invention. In order to effectuate coloring of substrates and media, any other standard colorant additives, such as resins, preservatives, surfactants, UV absorbers, antioxidants, solvents, antistatic compounds, and the like, may also be utilized within the inventive colorant compound compositions or methods.

DESCRIPTION OF THE PREFERRED EMBODIMENT

The general method of making the preferred inventive colorant is as follows:

First, an aromatic amine intermediate [such as depicted in Formula (IV), above] was formed to which the necessary water-solubilizing and colorizing pendant groups were then added. The presence of an aryloxypolyoxyalkylene moiety permitted easy addition of the necessary pendant groups in order to provide the desired color strength and shade as well as the targeted physical properties (e.g., water solubility, and the like).

The specific formulations below, as well as the following exemplified methods of coloring are thus indicative of the preferred embodiments of this invention:

Intermediate Formation

EXAMPLE 1

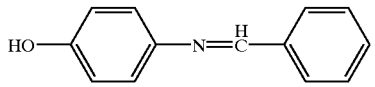

Ethanol (200 proof, 515 g) and p-aminophenol (300 g, 2.75 mol) were charged into a 2L 3-neck round bottom flask equipped with a thermometer and a condenser. Benzaldehyde (292 g, 2.75 mol) was added from an additional funnel while maintaining a slow and steady flow and while stirring. Another portion of ethanol (150 g) was added and the whole mixture was heated to reflux for 1.5 h. After cooling down to room temperature, the solid thus formed was collected by filtration and washed three times with ethanol (3×50 ml) and dried. 492 g (91%) of the imine product (structure above) was obtained as a pale yellow powder.

EXAMPLE 2

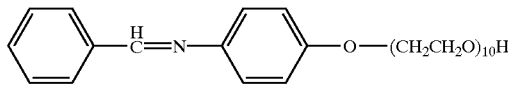

The imine product (285 g, 1.44 mol) from Example 1, toluene (200 ml) and KOH (6 g) were charged into a one-gallon stainless steel reactor. After being purged 3 times to 60 psi with nitrogen, the reaction mixture was heated to 250° F. and ethylene oxide (635 g, 14.4 mol) was added over a period of 2 hours. The mixture was then cooled down to room temperature and the toluene was stripped to yield 910 g (98.2%) of pale brown yellow liquid product polyethylene glycol imine (structure above).

EXAMPLE 3

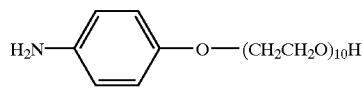

The polyethylene glycol imine (340 g, 0.27 mol) from Example 2 and water (150 g) were charged into a 1000-ml 3-neck flask. Concentrated hydrochloric acid (56 g) was added carefully while stirring and maintaining the temperature below 45° C. After stirred for 30 min at 50 C, the mixture was transferred into a 1000-ml flask and stripped by a rotary evaporator at 85–95° C. for 1.5 hour. After cooling down to room temperature, 240 g of water was charged into the reaction mixture and the whole was stripped at 85–95° C. for 1.5 hour. Then another 240 g of water was added and the mixture was stripped at 85–95° C. till all of the water and benzaldehyde were removed. 285 g (97%) of product polyethylene glycol aniline (structure above) was obtained as a light brownish yellow liquid.

EXAMPLE 4

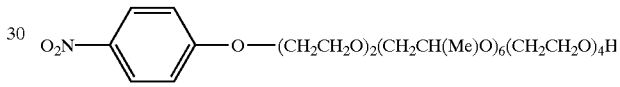

4-Nitrophenol (218 g, 1.57 mol), toluene (500 g) and KOH (4 g) were charged into a one gallon stainless steel reactor. After being purged 3 times to 60 psi with nitrogen, the reaction mixture was heated to 250° F. and ethylene oxide (138 g, 3.14 mol) was added over a period of 30 min. The mixture was post-heated to 120° F. for 1 hour, and then followed by the addition of propylene oxide (567 g, 9.77 mol) in a period of 1 hour. After being post-heated for 1 hour at 120° F., ethylene oxide (265 g, 6.02 mol) was charged into the reactor in 1 hour and the mixture was heated for another 2 hours at 120° F. Upon vacuum stripped for 1.5 hours at 235° F. and cooling down to room temperature, 1132 g (95%) of product nitrophenol (structure above) was obtained as a pale yellow liquid.

EXAMPLE 5

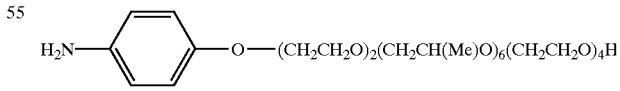

The nitrophenol (120 g, 0.16 mol) from Example 4 and ethanol (100 ml) were charged into a 500-ml hydrogenation flask. Then Pd/C (5%, 3 g) was carefully added and the whole was hydrogenated at 42 psi for 1 hour. After removal of catalyst and ethanol, 106 g (92%) of product aminophenol (structure above) was obtained as a pale yellow liquid.

EXAMPLE 6

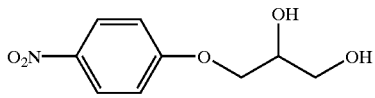

The 4-Nitrophenol (300 g, 2.16 mol), toluene (240 ml) and KOH flake (0.6 g) were charged into a 1000-ml 3-neck flask and the mixture was heated to 90° C. for 30 min. After cooling down to 5° C., glycidol (192 g, 2.59 mol) was introduced through an additional funnel while stirring and the resulting mixture was heated to 90° C. for 24 hours. GC-MS found that the 4-nitrophenol was consumed. The reaction was cooling down, toluene and excess of glycidol were removed by a rotary evaporator. 440 g (95.7%) of product nitrophenoxyglycidol (structure above) was obtained.

EXAMPLE 7

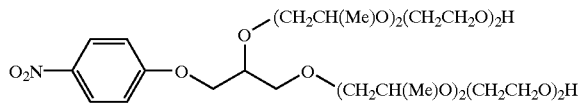

As described in Example 4, the nitrophenoxyglycidol (250 g, 1.17 mol), toluene (500 g) and KOH (4 g) were charged into a one-gallon stainless steel reactor. After being purged 3 times to 60 psi with nitrogen, the reaction mixture was heated to 250 F and propylene oxide (274 g, 4.72 mol) was added over a period of 1 hour. The mixture was heated to 120° F. for 1 hour, and then followed by the addition of ethylene oxide (207 g, 4.72 mol) in a period of 1 hour. After being heated for 2 hours at 120° F., the mixture was stripped for 1.5 hours at 235° F. Upon cooling down to room temperature, 712 g (97%) of product nitrophenoxyglycidol (structure above) was obtained as a pale yellow liquid.

EXAMPLE 8

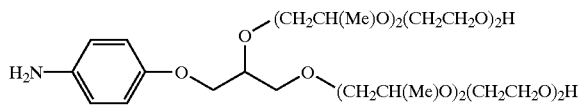

Following the procedure as described in Example 5, 105 g (92%) of 4-amino-phenoxyglycidol (structure above) was prepared from the reduction of 120 g (0.19 mol) of the nitrophenoxyglycidol from Example 7 in methanol (100 ml) in the presence of Pd/C (5%, 5 g), as a pale yellow liquid.

EXAMPLE 9

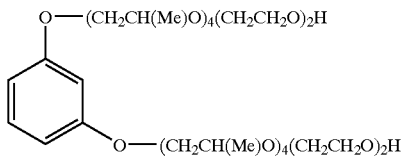

Resorcinol (250 g, 2.27 mol), toluene (125 g) and potassium hydroxide (1.5 g) were charged into a one-gallon stainless steel reactor. After being purged three times with nitrogen, the reaction was heated to 250° F., and propylene oxide (1053 g, 18.16 mol) was added over 2 hours to the reactor. The reaction mixture was post heated for 1.5 hours at 120° F. Ethylene oxide (400 g, 9.09 mol) was then added into the reactor over a period of 1.5 hours, and the whole was post heated for another 2 hours at 120° F. After cooling down to room temperature, toluene was stripped from the product, yielding 1698 g (99.7%) a slightly viscous liquid product poly(oxyalkylenated) resorcinol (structure above).

EXAMPLE 10

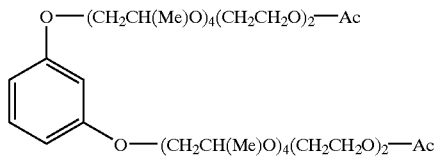

The resorcinol (100 g, 0.133 mol) from Example 9 and ethyl acetate (300 ml) were charged into a 3-neck 1000 ml flask. To the stirred solution, triethylamine (32 g, 0.317 mol) was added and the solution cooled to 0° C. While the reaction mixture was under a nitrogen atmosphere, acetyl chloride (25 g, 0.317 mol) was added at a rate such that the temperature remained between 0–10 C. After the addition, the reaction was stirred under nitrogen for two hours at 0–5° C. After warming up to room temperature, the nitrogen blanket was discontinued and the mixture filtered to remove precipitated triethylammonium chloride. The organic solution was washed three times, first with water (300 ml), next with 5% aqueous sodium carbonate (300 ml), and last with water (300 ml). All solvents were stripped from the product via rotary evaporation, yielding 103.9 g (93.7%) of a slightly yellow liquid product esterified poly(oxyalkylenated) resorcinol (structure above).

EXAMPLE 11

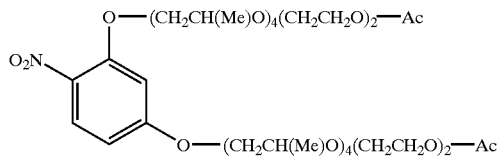

The resorcinol (52 g, 0.062 mol) of Example 10 was dissolved in methylene chloride (260 ml) and the solution cooled to 0° C. At 0° C., 93% sulfuric acid (72 g) was added while maintaining a temperature below 10° C. While the reaction mixture was under a nitrogen atmosphere, concentrated nitric acid (6.25 g) was added with vigorous stirring. After the addition of nitric acid, the mixture was warmed slowly to room temperature and stirred for two hours. The aqueous layer was separated from the organic layer with the aid of a separation funnel. The green aqueous layer was added slowly to a solution (cooled to 0° C.) of water (425 ml) and caustic (110 g) maintaining a temperature below 20° C. during the addition. After the addition, the pH was checked and adjusted to 6–7 as necessary. Afterwards, the mixture was heated to 70° C. and transferred to a separation funnel. The dark product layer was drained from the bottom (the nitroresorcinol of the above structure) and used immediately in the next step (Example 12).

EXAMPLE 12

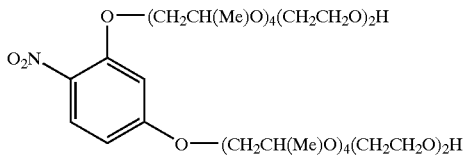

A solution of the dark product layer from Example 11, water (104 g), caustic (20 g) and 45% potassium hydroxide (3.60 g) was heated to 95° C. and held for four hours. After this time period, the mixture was cooled to 40° C., at which, 93% sulfuric acid was added to adjust the pH to 7.5. Next, the mixture was heated to 75° C. and transferred to a separation funnel while hot. After cooling to room temperature, the bottom product layer was collected and combined with a solution of ammonium carbonate (25 g) in water (175 g). The mixture was heated to 65° C. and transferred to a separation funnel. After phase separation, the bottom product layer was stripped of water via rotary evaporation, leaving 30 g (59%, overall yield from Example 11) of product nitroresorcinol (structure above) as a viscous liquid.

EXAMPLE 13

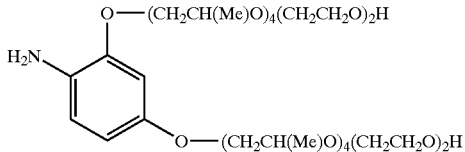

Palladium on carbon (0.5 g) was weighed in a Parr bottle followed by a small amount of water needed to keep the catalyst wet. The nitroresorcinol (13 g, 0.016 mol) from Example 12 was added to the bottle followed by 100 ml of water containing muriatic acid (1.74 g). Hydrogen was added to the reaction mixture with the aid of a Parr apparatus. Once hydrogen uptake ceased, the catalyst was removed from the reaction mixture and the water was stripped with the aid of a rotary evaporator. 12.2 g (95.1%) of product aminoresorcinol hydrochloride salt was collected as a light brown liquid.

EXAMPLE 14

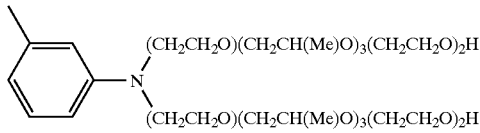

In a 2-gallon stainless steel reactor were charged m-toluidine (350 g, 3.27 mol), toluene (500 ml) and KOH (6 g). The reactor was purged 3 times to 60 psi with nitrogen and the reaction mixture was heated to 250° F. under 5 psi nitrogen pressure. Ethylene oxide (288 g, 6.54 mol) was added over a period of 1 hour at a rate of maintaining a vapor pressure reading less than 80 psi. The mixture was post-heated to 120° F. for 1.5 hour, and then followed by the addition of propylene oxide (1137 g, 19.62 mol) in a period of 1.5 hour. After being post-heated for 1.5 hour at 120° F., ethylene oxide (576 g, 13.08 mol) was charged into the reactor in 1 hour and the mixture was post-heated for another 2 hours at 120° F. Upon vacuum stripped for 1.5 hours at 235° F. and cooling down to room temperature, 2300 g (97.7%) of product poly(oxyalkylenated) m-toluidine (structure above) was obtained as a pale yellow liquid.

EXAMPLE 15

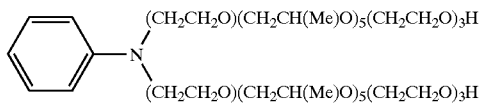

The procedure described in Example 14 was followed exactly. 3804 g (98.7%) g of product poly(oxyalkylenated) aniline (structure above) was made from the reaction of aniline (350 g, 3.76 mol), toluene (500 mol), KOH (6 g), ethylene oxide (331 g, 7.53 mol), propylene oxide (2180 g, 37.6 mol) and ethylene oxide (993 g, 22.56 mol), as a pale yellow liquid (structure above).

Polymeric Colorant Formation

EXAMPLE 16

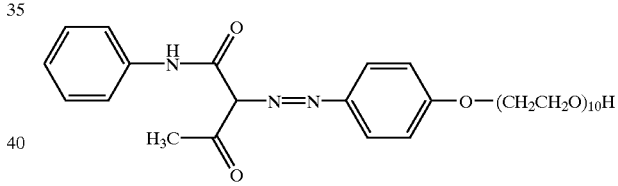

To a 100-ml 3-neck flask were charged water (20 ml), muriatic acid (3.8 g), 2-ethylhexanol and the polyethylene glycol aniline (19.2 g, 35 mmol) from Example 3. The mixture was cooled down to 0° C. by an ice bath. A solution of NaNO2 (4.4 g) in 10 ml of water was slowly added while stirring and maintaining the temperature below 5° C. After completion of the addition, the reaction mixture was stirred at 0–5° C. for 40 min. To this solution, sulfamic acid (2.5 g) was carefully added and the resulting mixture was stirred at 0–5° C. for 30 min.

To another 250-ml flask were charged caustic (3 g), versene (6 g), water (35 ml) and acetoacetanilide (6.2 g, 35 mmol), the mixture is stirred and cooled down to 5–10° C. The above diazo solution was slowly introduced into this acetoacetanilide solution while stirring and maintaining the temperature at lower than 15° C. The resulting mixture was post-stirred for 1 hour at 10–15° C. After adjusting pH to 7.5–8.5, the mixture was heated to 70° C. and poured into a separation funnel. Organic layer was collected and washed twice with water (2×50 ml). Upon being stripped for 1.5 hour at 95° C. to remove water, 19 g of product (structure above) was obtained as a yellow viscous liquid with a color-strength of 41.1 abs./g/L (MeOH) and the maximum absorbency at 389 nm.

EXAMPLE 17

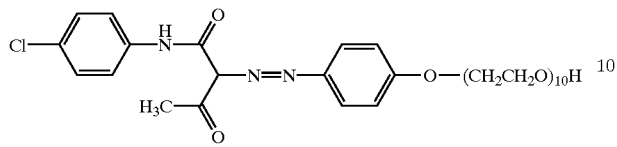

Following the procedure described in Example 16, the polyethylene glycol aniline (19.2 g, 35 mmol) from Example 3 was diazotised and coupled with 4'-chloroacetoacetanilide (7.4 g, 35 mmol). Upon being washed and stripped, 18 g of product was obtained as a yellow viscous liquid (structure above) with a color-strength of 42.7 abs./g/L (MeOH) and the maximum absorbency at 392 nm.

EXAMPLE 18

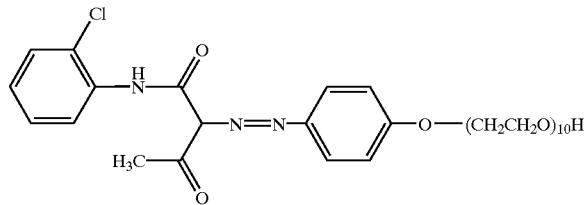

Following the procedure described in Example 16, the polyethylene glycol aniline (19.2 g, 35 mmol) from Example 3 was diazotised and coupled with 2'-chloroacetoacetanilide (7.4 g, 35 mmol). Upon being washed and stripped, 20 g of product was obtained as a yellow viscous liquid (structure above) with a color-strength of 36 abs./g/L (MeOH) and the maximum absorbency at 390 nm.

EXAMPLE 19

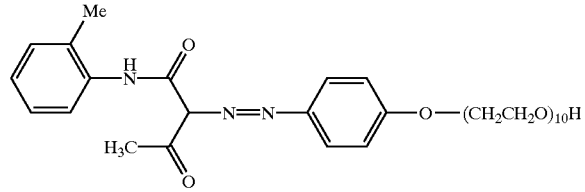

Following the procedure described in Example 16, the polyethylene glycol aniline (19.2 g, 35 mmol) from Example 3 was diazotised and coupled with 2'-acetoacetoluidide (6.7 g, 35 mmol). Upon being washed and stripped, 17 g of product was obtained as a yellow viscous liquid (structure above) with a color-strength of 38 abs./g/L (MeOH) and the maximum absorbency at 390 nm.

EXAMPLE 20

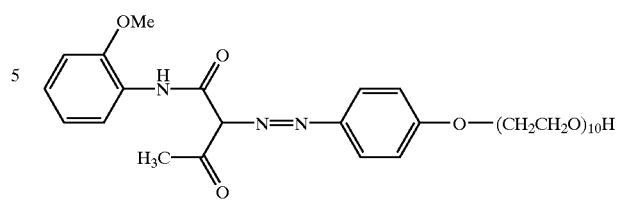

Following the procedure described in Example 16, the polyethylene glycol aniline (19.2 g, 35 mmol) from Example 3 was diazotised and coupled with 2'-acetoacetanisidide (7.35 g, 35 mmol). Upon being washed and stripped, 17 g of product was obtained as a yellow viscous liquid (structure above) with a color-strength of 39 abs./g/L (MeOH) and the maximum absorbency at 392.5 nm.

EXAMPLE 21

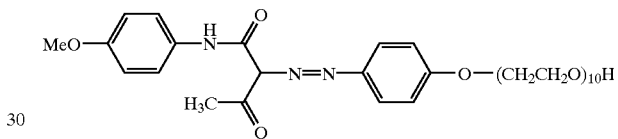

Following the procedure described in Example 16, the polyethylene glycol aniline (19.2 g, 35 mmol) from Example 3 was diazotised and coupled with 4'-acetoacetanisidide (7.35 g, 35 mmol). Upon being washed and stripped, 19 g of product was obtained as a yellow viscous liquid (structure above) with a color-strength of 36 abs./g/L (MeOH) and the maximum absorbency at 392 nm.

EXAMPLE 22

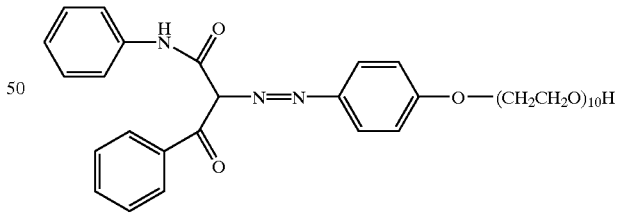

Following the procedure described in Example 16, the polyethylene glycol aniline (19.2 g, 35 mmol) from Example 3 was diazotised and coupled with 2-benzoylacetoacetanilide (8.37 g, 35 mmol). Upon being washed and stripped, 16 g of product was obtained as a yellow viscous liquid (structure above) with a color-strength of 31 abs./g/L (MeOH) and the maximum absorbency at 398 nm.

EXAMPLE 23

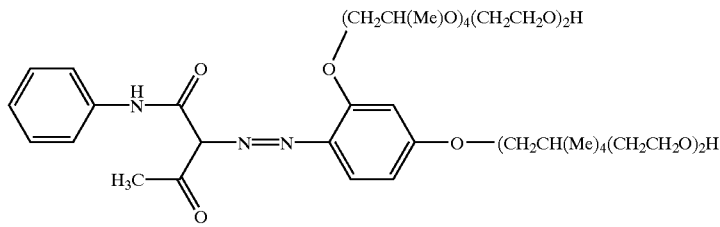

Water (7.4 ml), muriatic acid (2.37 g), 2-ethylhexanol (0.11 g) and the aminoresorcinol (8.57 g, 0.011 mol) from Example 13 were combined in a 100 ml 3-neck flask. Once the solution was cooled to 0° C., a solution of sodium nitrite (0.9 g, 0.023 mol) in water (3.7 g) was added at a rate such that the temperature remained between 0–5° C. After the addition, the reaction continued at 0–5° C. for one hour. Sulfamic acid was added slowly to the diazonium salt solution until excess nitrous acid was destroyed (determined by starch-iodine paper). This diazonium salt solution was added to the coupling solution cooled to 5° C. The coupling solution consisted of acetoacetanilide (1.90 g, 0.011 mol), water (11 ml), versene (2.0 g), and caustic (1.5 g). After stirring for one hour at 0–5° C. and heating slowly to room temperature, the pH was adjusted to 7–8 using diluted acid. The mixture was heated to 70° C. and transferred to a separatory funnel. Once cooled to room temperature, the bottom product layer was collected and combined with water (100 ml) containing ammonium carbonate (10 g), heated again to 70° C. and phase separated. Water was stripped from the bottom product layer via rotary evaporation, yielding 6.4 g of product as a yellow viscous liquid (structure above) with a color-strength of 22 abs./g/L (MeOH) and the maximum absorbency at 407 nm.

EXAMPLE 24

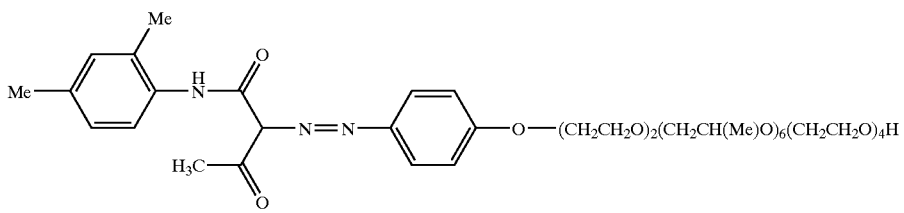

The 4-Aminophenol (50 g, 0.069 mol) from Example 5, water (40 g), 2-ethylhexanol (0.6 g) and muriatic acid (17 g) were combined in a reaction vessel and cooled to 0° C. At 0° C., a solution of sodium nitrite (4.80 g, 0.070 mol) in water (20 g) was added at a rate such that the temperature did not exceed 5° C. After the addition, the reaction proceeded at 0–5° C. for one hour. Sulfamic acid was used to destroy excess nitrous acid (determined by starch-iodine paper). The diazonium salt solution was added to the coupling solution cooled to 5° C. The coupling solution consisted of acetoacet-m-xylidide (14.15 g, 0.069 mol), caustic (13 g), versene (13 g) and water (180 ml). After stirring for two hours at room temperature, the pH was adjusted to 7.5 using 93% sulfuric acid. The mixture was heated to 70° C. and transferred to a separation funnel. After cooling to room temperature, the bottom product layer was collected, combined with water (100 ml) and the resulting solution heated to 70° C. After phase separation, the bottom product layer was stripped of water via rotary evaporation. 35 g of product were collected as a yellow viscous liquid (structure above) with a color-strength of 33.1 abs./g/L (MeOH) and the maximum absorbency at 388 nm.

EXAMPLE 25

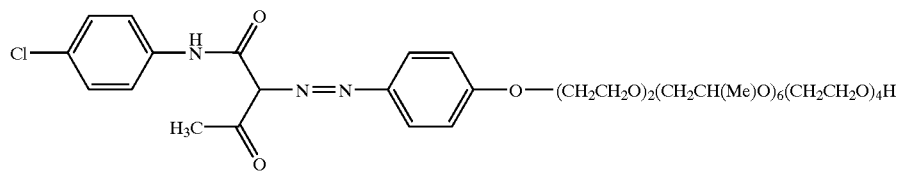

Following the procedure described in Examples 16 & 24, the 4-aminophenol (25.6 g, 35 mmol) from Example 5 was diazotised and coupled with 4'-chloroacetoacetanilide (7.4 g, 35 mmol). Upon being washed and stripped, 23 g of product was obtained as a yellow viscous liquid (structure above) with a color-strength of 31 abs./g/L (MeOH) and the maximum absorbency at 390 nm.

EXAMPLE 26

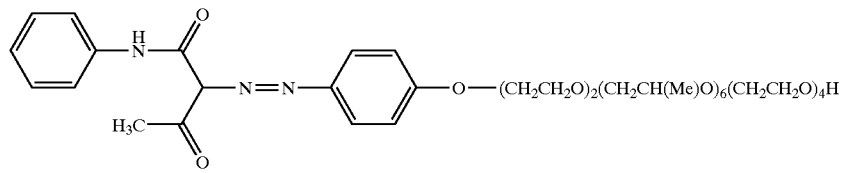

Following the procedure described in Examples 16 and 24, the 4-aminophenol (25.6 g, 35 mmol) from Example 5 was diazotised and coupled with acetoacetanilide (6.2 g, 35 mmol). Upon being washed and stripped, 21 g of product was obtained as a yellow viscous liquid (structure above) with a color-strength of 32 abs./g/L (MeOH) and the maximum absorbency at 389.5 nm.

EXAMPLE 27

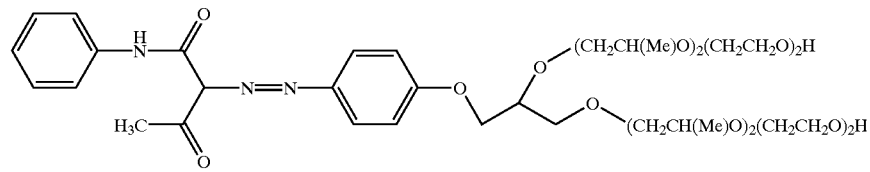

Following the procedure described in Example 16, the 4-amino-phenoxyglycidol (20.6 g, 35 mmol) from Example 8 was diazotised and coupled with acetoacetanilide (6.2 g, 35 mmol). Upon being washed and stripped, 24.7 g of product was obtained as a yellow viscous liquid (structure above) with a color-strength of 21 abs./g/L (MeOH) and the maximum absorbency at 389 nm.

EXAMPLE 28

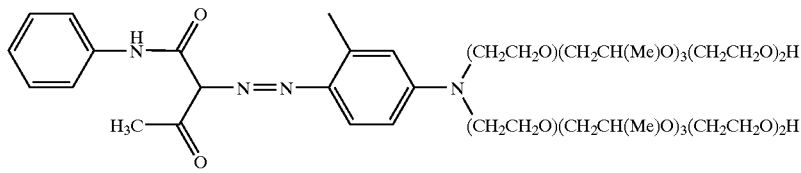

To a 250-ml 3-neck flask, were charged the polly (oxyalkylenated m-toluidine (28.6 g, 40 mmol) from Example 14, water (15 ml) and 2-ethylhexanol (0.5 g). Muriatic acid (8 g) was introduced into the mixture while stirring. Upon cooled to 0° C., a solution of $NaNO_2$ (2.9 g) in 5 ml of water was slowly added while maintaining the temperature below 5° C. After post-stirred for 1 hour, sulfamic acid (1.5 g) was carefully added to decompose the excess of nitrous acid and the whole was post-stirred for 20 min at below 5° C.

The resulting mixture was neutralized to pH 7–8 by caustic, and then was added carefully another potion of caustic (12 g) while maintaining the temperature at 30–40° C. At this temperature, sodium hydrosulfite (13.7 g, 80 mmol) was slowly introduced into the reaction mixture and the temperature rose to 60–65° C. The resulting mixture was post-heated to 65° C. for 1.5 hour. Upon cooled to room temperature, the reaction was neutralized to pH 7.5–8.5 by 93% sulfuric acid and then was added water (30 ml). The mixture was subsequently heated to 70° C. and poured into a separation funnel for phase separation. The organic layer was collected back into the 250-ml flask.

To this organic layer were added water (15 ml), 2-ethylhexanol (0.5 g) and muriatic acid (8 g). The mixture was stirred for 20 min at 0–5° C. While maintaining the temperature at below 5° C., a solution of $NaNO_2$ (2.9 g, 42 mmol) in water (8 ml) was slowly added into the reaction and the resulting mixture was post-stirred for 1 hour. Sulfamic acid (1.5 g) was carefully introduced to the mixture to decompose excess of the nitrous acid while maintaining temperature below 5° C. to result in the Diazo solution.

Acetoacetanilide (7.1 g, 40 mmol), versene (8 g), water (35 ml) and caustic (6.5 g) were charged into another 250-ml flask and the mixture was stirred for 15 min and cooled to 5–10° C. To this solution was slowly introduced the above Diazo solution while maintaining the temperature below 15° C. The resulting mixture was post-stirred at this temperature for 1 hour and the neutralized to pH 7.5–8.5 by 93% sulfuric acid. After being heated to 70° C., the reaction mixture was poured into a separation funnel. Upon settlement, the organic layer was collected and washed with hot water (60 ml) and stripped, yielding 21 g of product as a yellow viscous liquid (structure above) with a color-strength of 10 abs./g/L (MeOH) and the maximum absorbency at 436.5 nm.

EXAMPLE 29

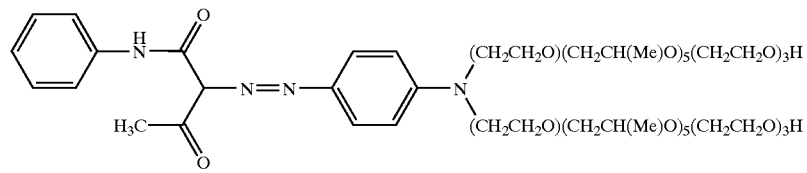

Following the procedure described in Example 28, the aniline (41 g, 40 mmol) from Example 15 was nitrosated by nitrous acid, reduced by sodium hydrosulfite, and then diazotised and coupled with acetoacetanilide (7.1 g, 40 mmol). Upon being washed and stripped, 35.7 g of product was obtained as a yellow viscous liquid (structure above) with a color-strength of 12.3 abs./g/L (MeOH) and the maximum absorbency at 440.5 nm.

EXAMPLE 30

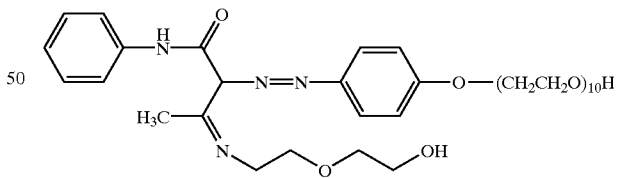

Two different methods were followed to produce this colorant

Method A:

The polymeric acetoacetanilide azo yellow colorant (40 g, 52 mmol) from Example 16 and diglycolamine (6 g, 55 mmol) were charged into a 100-ml 3-neck flask. The mixture was stirred and heated to 105–115° C. for 2–3 hours. Infrared analysis of the product showed the disappearance of the peak at 1653 cm-1, which corresponds to the acetyl group that is present in the starting material yellow colorant. Upon being stripped to remove water, 40 g of product diglycolamine modified polymeric acetoacetanilide azo colorant was collected as a viscous yellow liquid with a color-strength of 36 abs./g/L (MeOH) and the maximum absorbency at 388 nm.

Method B:

The polymeric acetoacetanilide azo yellow colorant (40 g, 52 mmol) from Example 16, toluene (80 ml) and diglycolamine (6 g, 55 mmol) were charged into a 250-ml 3-neck flask equipped with a Dean-Stark trap. The mixture was stirred and refluxed for 4–6 hours. Infrared analysis of the product showed the disappearance of the peak at 1653 cm$^{-1}$, which corresponds to the acetyl group that is present in the starting material yellow colorant. Upon being stripped to remove toluene, 39 g of product diglycolamine modified polymeric acetoacetanilide azo colorant was collected as a viscous yellow liquid with a color-strength of 34 abs./g/L (MeOH) and the maximum absorbency at 388 nm.

EXAMPLE 31

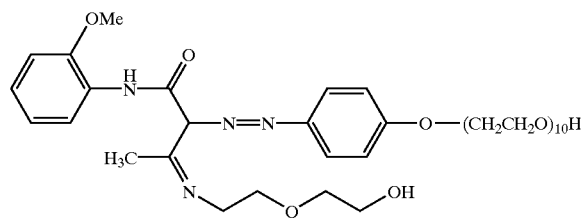

Polymeric 2'-acetoacetanilide azo yellow colorant (6 g, 7.8 mmol, from Example 20), ethanol (30 ml) and diglycolamine (0.9 g, 8.5 mmol) were charged into a 100-ml 3-neck flask. The mixture was stirred and refluxed for 2–3 hours. Infrared analysis of the product showed the disappearance of the peak at 1655 cm$^{-1}$, which corresponds to the acetyl group that is present in the starting material yellow colorant. Upon being stripped to remove ethanol and water, 6 g of product diglycolamine modified polymeric 2'-acetoacetanisidide azo colorant was collected as a viscous yellow liquid (structure above) with a color-strength of 35 abs./g/L (MeOH) and the maximum absorbency at 392 nm.

EXAMPLE 32

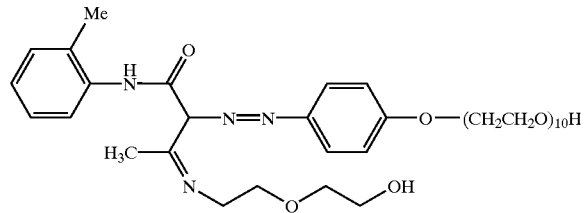

Polymeric 2'-acetoacetoluidide azo yellow colorant (40 g, 52 mmol, from Example 19) and diglycolamine (6 g, 55 mmol) were charged into a 100-ml 3-neck flask. The mixture was stirred and heated to 160–165 C. for 1–2 hours while a stream of nitrogen was passed through the mixture to remove from it the water formed by the reaction. Infrared analysis of the product showed the disappearance of the peak at 1656 cm$^{-1}$, which corresponds to the acetyl group that is present in the starting material yellow colorant. Upon being cooled to room temperature, 35 g of product diglycolamine modified polymeric 2'-acetoacetoluidide azo colorant was collected as a viscous yellow liquid (structure above) with a color-strength of 29 abs./g/L (MeOH) and the maximum absorbency at 388 nm.

EXAMPLE 33

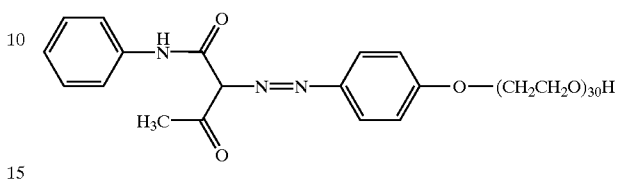

To a 250-ml 3-neck flask were charged water (20 ml), muriatic acid (3.5 g), 2-ethylhexanol (0.3 g) and the polyethylene glycol aniline (49.9 g, 35 mmol) from Example 3. The mixture was cooled down to 0° C. by an ice bath. A solution of NaNO2 (4.5 g) in 10 ml of water was slowly added while stirring and maintaining the temperature below 5° C. After completion of the addition, the reaction mixture was stirred at 0–5° C. for 40 min. To this solution, sulfamic acid (2.5 g) was carefully added and the resulting mixture was stirred at 0–5° C. for 30 min.

To another 250-ml flask were charged caustic (3 g), versene (6 g), water (35 ml) and acetoacetanilide (6.2 g, 35 mmol), the mixture is stirred and cooled down to 5–10 C. The above diazo solution was slowly introduced into this acetoacetanilide solution while stirring and maintaining the temperature at lower than 15° C. The resulting mixture was post-stirred for 1 hour at 10–15° C. After adjusting pH to 7.5–8.5, the mixture was heated to 70° C. and poured into a separation funnel. Organic layer was collected yielding a yellow liquid (structure above) which was 63.7% solids and having a color-strength of 9.15 abs./g/L (Water) and the maximum absorbency at 386 nm.

EXAMPLE 34

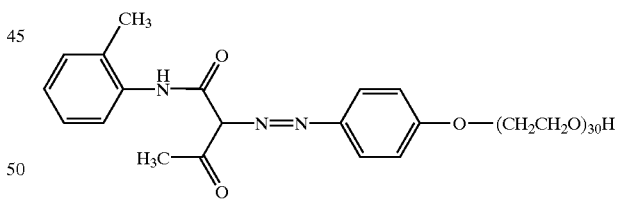

To a 1000-ml 3-neck flask were charged water (100 ml), muriatic acid (35.0 g), 2-ethylhexanol (3.0 g) and the polyethylene glycol aniline (499.2 g, 350 mmol) from Example 3. The mixture was cooled down to 0° C. by an ice bath. A solution of NaN$_{O2}$ (44.2 g) in 100 ml of water was slowly added while stirring and maintaining the temperature below 5° C. After completion of the addition, the reaction mixture was stirred at 0–5° C. for 40 min. To this solution, sulfamic acid (25 g) was carefully added and the resulting mixture was stirred at 0–5° C. for 30 min.

To another 1000-ml flask were charged caustic (30.0 g), versene (60.0 g), water (175.1 ml) and 2'-acetoacetoludidide (64.8 g, 350 mmol), the mixture is stirred and cooled down to 5–10° C. The above diazo solution was slowly introduced into this 2'-acetoacetoludidide solution while stirring and maintaining the temperature at lower than 15° C. The resulting mixture was post-stirred for 1 hour at 10–15° C. After adjusting pH to 7.5–8.5, the mixture was heated to 70 C. and poured into a separation funnel. Organic layer was collected yielding a yellow liquid (structure above) which was 49.6% solids and having a color-strength of 5.7 abs./g/L (Water) and the maximum absorbency at 387 nm.

EXAMPLE 35

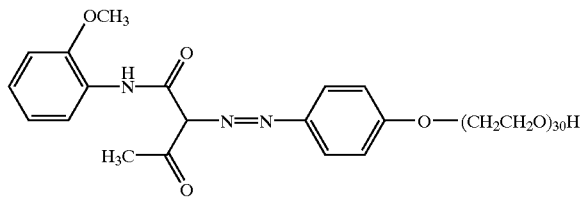

To a 1000-ml 3-neck flask were charged water (100 ml), muriatic acid (35.0 g), 2-ethylhexanol (3.0 g) and the polyethylene glycol aniline (498.2 g, 350 mmol) from Example 3. The mixture was cooled down to 0° C. by an ice bath. A solution of $NaN_{O2}$ (44.5 g) in 100 ml of water was slowly added while stirring and maintaining the temperature below 5° C. After completion of the addition, the reaction mixture was stirred at 0–5° C. for 40 min. To this solution, sulfamic acid (10 g) was carefully added and the resulting mixture was stirred at 0–5° C. for 30 min.

To another 1000-ml flask were charged caustic (32.3 g), versene (60.0 g), water (175.0 ml) and this 2'-acetoacetanisidide (67.0 g, 350 mmol), the mixture is stirred and cooled down to 5–10 C. The above diazo solution was slowly introduced into this 2'-acetoacetanisidide solution while stirring and maintaining the temperature at lower than 15° C. The resulting mixture was post-stirred for 1 hour at 10–15° C. After adjusting pH to 7.5–8.5, the mixture was heated to 70° C. and poured into a separation funnel. Organic layer was collected yielding a yellow liquid (structure above) which was 59.6% solids and having a color-strength of 8.4 abs./g/L (Water) and the maximum absorbency at 392 nm.

EXAMPLE 36

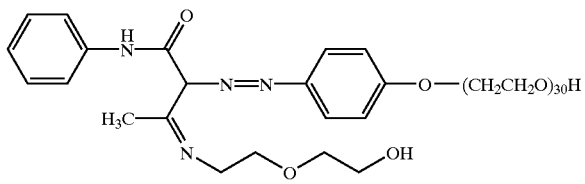

The polymeric yellow liquid from Example 35 was stripped for 1.5 hours at 95° C. to remove water, yielding a viscous yellow product. This polymeric acetoacetanilide azo yellow colorant (98.3 g, 69 mmol) and diglycolamine (7.2 g, 69 mmol) were charged into a 100-ml 3-neck flask. The mixture was stirred and heated to 105–115° C. for 2–3 hours. Infrared analysis of the product showed the disappearance of the peak at 1653 cm$^{-1}$, which corresponds to the acetyl group that is present in the starting material yellow colorant. Upon being stripped to remove water, 104 g of product diglycolamine modified polymeric acetoacetanilide azo colorant was collected as a viscous yellow liquid (structure above) with a color-strength of 13 abs./g/L (Water) and the maximum absorbency at 384 nm.

EXAMPLE 37

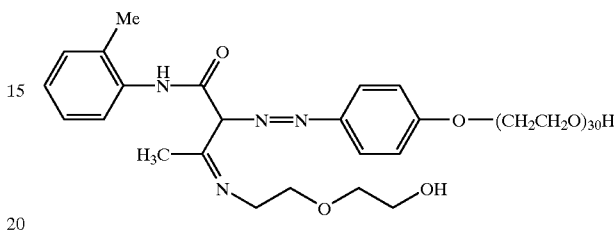

The polymeric yellow liquid from Example 36 was stripped for 1.5 hours at 95° C. to remove water, yielding a viscous yellow product. This polymeric azo yellow 2'-acetoacetoludidide colorant (86.0 g, 60 mmol) and diglycolamine (6.3 g, 60 mmol) were charged into a 100-ml 3-neck flask. The mixture was stirred and heated to 105–115° C. for 2–3 hours. Infrared analysis of the product showed the disappearance of the peak at 1651 cm$^{-1}$, which corresponds to the acetyl group that is present in the starting material yellow colorant. Upon being stripped to remove water, 92 g of product diglycolamine modified polymeric acetoacetanilide azo colorant was collected as a viscous yellow liquid (structure above) with a color-strength of 12 abs./g/L (Water) and the maximum absorbency at 393 nm.

EXAMPLE 38

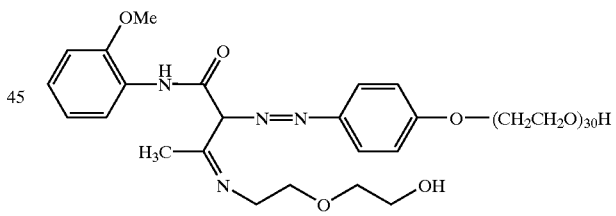

The polymeric yellow liquid from Example 37 was stripped for 1.5 hours at 95° C. to remove water, yielding a viscous yellow product. Polymeric 2'-acetoacetanisidide azo yellow colorant (19.0 g, 13 mmol,) and diglycolamine (1.4 g, 13 mmol) were charged into a 100-ml 3-neck flask. The mixture was stirred and heated to 105–115° C. for 2–3 hours. Infrared analysis of the product showed the disappearance of the peak at 1655 cm$^{-1}$, which corresponds to the acetyl group that is present in the starting material yellow colorant. Upon being stripped to remove water, 19.5 g of product diglycolamine modified polymeric 2'-acetoacetanisidide azo colorant was collected as a viscous yellow liquid (structure above) with a color-strength of 11.5 abs./g/L (Water) and the maximum absorbency at 385 nm.

EXAMPLE 39

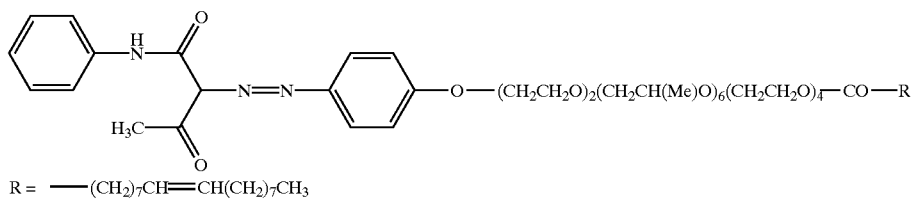

R = —(CH$_2$)$_7$CH=CH(CH$_2$)$_7$CH$_3$ 12 g of the AAA colorant from Example 26 was charged to a reactor with 1.73 g of triethylamine and 20 mL of tetrahydrofuran (THF). To this mixture was slowly added 5.34 g of oleoyl chloride at room temperature. The resulting mixture was then heated to 40° C. and monitored by infrared (IR) spectroscopy to determine the point in time during the reaction at which the acid chloride peak (~800 nm) disappeared. The mixture was then placed in a separatory funnel in which it was washed with aqueous sodium carbonate and water. The organic phase of the separated mixture was then filtered and stripped under vacuum to yield 11.97 g of a yellow paste like polymeric colorant (structure above).

Performance Characteristics

1. Base Stability of AAA
    Procedure: 0.100–0.105 g of an inventive colorant (example # below) was added to 30 ml of 0.1N aqueous NaOH and mixed well at room temperature. 1 ml aliquots of the resultant mixture were removed at different time intervals, dissolved in 100 ml of MeOH and analyzed by UV-VIS for their maximum absorption peaks.
Results:

| | Maximum Absorptions | | | |
|---|---|---|---|---|
| Time (h) | Example 16 | Example 17 | Example 19 | Example 20 |
| 0.25 | 1.40 | 1.48 | 1.47 | 1.52 |
| 2 | 1.38 | 1.42 | 1.44 | 1.49 |
| 4 | 1.38 | 1.39 | 1.39 | 1.46 |
| 6 | 1.30 | 1.38 | 1.37 | 1.47 |
| 24 | 1.26 | 1.36 | 1.36 | 1.47 |
| 32 | 1.20 | 1.38 | 1.33 | 1.44 |
| 48 | 1.12 | 1.40 | 1.32 | 1.45 |

As shown in the above table and graph, all of the inventive colorants exhibit good stability in a 0.1N aqueous NaOH solution.

2. Marker Formulations
    Fabric Washability
    Different fabric samples (50%/50% polyester/cotton and 100% cotton) were cut into four-inch squares. The samples were then stained by applying a staining medium (the colorants noted below in an aqueous medium introduced within a marker stylus and contacted in 6 to 8 stripes of color applied to the target fabric swatches) on the fabric in a 1–2 inch square and then hang-dried for 4 hours. Subsequently, the samples were washed with tap water at 41° C. (105° F.) while threading through fingers. The water was then squeezed out of each fabric sample and the pre-wash procedure was then repeated two more times. The fabric samples were then stapled to a single towel which was then placed within an in-home washing machine (with a towel without swatches to balance the load) with the wash cycle set at hot wash/cold rinse. After washing, the towels were placed within an in-home dryer set on cotton/sturdy for 30 minutes. The towels were then removed and the samples were removed from the stapled towel. The swatches were then placed on a white background and the remaining stains (if any) were graded in accordance with the following grading scale:
0=No stain remains
1=Very light stain
2=Light stain
3=Moderate stain
4=Severe stain
5=No stain removed
    Skin Washability
    The subject's hands were washed under tap water at 41° C. (105° F.) with liquid Ivory® soap and then dried thoroughly. The staining medium was then applied to the subject's hands by swiping the marker stylus back and forth across the palm about 6–8 times. The stain was then allowed to dry for 15 minutes. The stained hands were then washed under tap water at 41° C. (105° F.) using liquid Ivory® soap, dried thoroughly and graded empirically for the remaining stains in accordance with the following grading scale:
0=No stain remains
1=Very light stain
2=Light stain
3=Moderate stain
4=Severe stain
5=No stain removed

| | | | | Washability Results | |
|---|---|---|---|---|---|
| Sample | Mw | Correct CV[1] | Skin | Washability 50/50[2] Fabric | 100[3] Fabric |
| Example 16 | 737 | 43 | 2 | 2 | 3 |
| Example 30 | 816 | 39 | 2 | 2 | 3 |
| Example 33 | 1617 | 20 | 0 | 1 | 2 |
| Example 36 | 1696 | 19 | 0 | 1 | 2 |
| Eaxmple 35 | 1647 | 19 | 0 | 1 | 2 |
| Example 38 | 1726 | 18 | 0 | 1 | 2 |
| Example 34 | 1632 | 19 | 0 | 1 | 2 |
| Example 37 | 1711 | 18 | 0 | 1 | 2 |

[1]Correct CV: after stripping off water
[2]50/50 Fabric: 50% polyester and 50% cotton.
[3]100 Fabric: 100% cotton.

3. Candle Color Application
    0.21 g of the AAA colorant from EXAMPLE 41 were diluted in 19.79 g of Span(® 80. 2 g of this mixture were subsequently introduced within 98 g of molten paraffin wax. After mixing, the liquid wax solution became a homogeneous yellow composition. The liquid wax solution was then poured into a candle mold with a wick inserted in the middle and subsequently allowed to cool. The resultant homogeneous liquid wax solution (prior to cooling) exhibited little or no colorant droplets and the colorant was well dispersed throughout the resultant solid wax candle (after cooling). Furthermore, after removing the solid candle from the plastic beaker, there was no transfer of color from the candle indicating no appreciable migration of the colorant from the solid wax medium.

4. Polypropylene Articles

Tests were conducted to determine the extractability and clarity of the AAA Yellow colorants prepared (as described earlier).

In order to correct for varying color strengths, the colorants were all cut to a consistent color value with a polyethylene glycol 400 NF. This was accomplished by taking a known amount of colorant with a known color value. The amount of diluent added was determined as follows:

[(Uncut CV/Desired Cut CV)−1](Wgt. Of uncut color)=Weight of PEG 400 added

In this case, the preferred embodiment colorant was cut to a color value (CV) of 27.

For the extraction test, all colorants were loaded into polyolefin resins at 4000 ppm (4% by weight). The polypropylene random copolymer resin used in the extraction study was Fina® 7525. The general procedure for making plaques for extraction, clarity, and lightfastness testing was as follows. The proper weight of colorant was added to 100 gram of pelletized polyolefin resin. The mixture was then mixed 3 minutes on a laboratory Hobart mixer to insure uniform colorant distribution over the surface of the pellets. The samples were then extruded on a laboratory MPM single screw extruder at 325° F. The resulting colored pellets were then injection molded at 200° C. on an Arburg® 25-ton molder into plaques measuring 2"×3"×0.05". Background plaques were made by extruding and molding uncolored resin using the same procedure described above.

The procedure for testing extraction on the colored PP plaques prepared above was as follows. Plaques were placed in stainless steel dye kettles. The vessels had Teflon lined tops. The total volume of the container was 200 cc. It required 125 g of extraction solvent to cover the plaques. One plaque was cut in half and placed in each stainless steel pressure vessel. The two pieces of the plaque were separated by a glass slide. 125 Gram of the extraction solvent (10% EtOH) which had been preheated to 70° C. was then poured into the extraction vessel. The vessel was screw closed and placed in a 70° C. oven for two hours after which time the plaques were removed from the extraction solutions. The amount of color that was extracted from the plaques was determined by measuring the absorbance of the extracting solution in a 1.0 cm cell on a Beckman® DU-650 Spectrophotometer. The extraction solution from the uncolored plaques was used as a background.

The results are summarized below:

| Sample | % Haze | Extraction Absorbance |
|---|---|---|
| Example 27 | 26.0 | 0.002 |

5. Polyester Articles

Certain inventive AAA Yellow polymeric colorants were incorporated into PET resin as follows. In order to correct for varying color strengths, the loading of each color was calculated so that it was equivalent to 0.2% (by weight of the PET) at a color value of 27.0. The color was then mixed onto the surface of dried PET (Shell® 8430) pellets in a Hobart blender. The resulting colored pellets were then injection molded at 200 C. on an Arburg® 25-ton molder into plaques measuring 2"×3"×0.05". Background plaques were made by extruding and molding uncolored resin using the same procedure described above.

The procedure for testing extraction on the colored PET plaques prepared above was as follows. Plaques were placed in stainless steel dye kettles. The vessels had Teflon lined tops. The total volume of the container was 200 cc. It required 125 g of extraction solvent to cover the plaques. One plaque was cut in half and placed in each stainless steel pressure vessel. The two pieces of the plaque were separated by a glass slide. 125 Gram of the extraction solvent (10% EtOH) which had been preheated to 70° C. was then poured into the extraction vessel. The vessel was screw closed and placed in a 70° C. oven for two hours after which time the plaques were removed from the extraction solutions. The amount of color that was extracted from the plaques was determined by measuring the absorbance of the extracting solution in a 10.0 cm cell on a Beckman® DU-650 Spectrophotometer. The extraction solution from the uncolored plaques was used as a background.

The results are summarized below:

| Sample | % Haze | Extraction Absorbance |
|---|---|---|
| Example 19 | 1.8 | undetectable |
| Example 32 | 1.7 | undetectable |
| Example 27 | 2.0 | 0.0003 |

6. Colored Foam Articles

Polyurethane foams were produced with the following composition and in accordance with the following prcedure:

| Component | Amount (php of the polyol content) |
|---|---|
| F3022 Polyol | 100 parts |
| Water | 4.53 |
| DABCO TL (catalyst) | 0.15 |
| DABCO T10 (catalyst) | 0.30 |
| L520 Silicone (from ?) | 1.0 |
| 82/20 toluene diisocyanate | 43.6 |
| Colorant | 1.0 |

The individual colorants utilized within the example foams were the following: Examples 16, 17, 18, 19, 20, 21, 24, 25, 27, 30, and 31. Upon mixture within a reaction vessel, the reaction created a "health" bubble, and the vessel was then exposed to 185° C. (generated within a microwave oven to simulate actual temperatures encountered on an industrial production level) for about 10 minutes. The resultant foam bun was then sliced in half and analyzed empirically. All of the above inventive colorants provided very bright yellow foam articles.

The foam articles comprising the inventive colorants from Examples 16, 17, 18, 19, 20, and Example 21 were also analyzed for lightfastness by directly exposing each individual article to a Xenon light for 5, 10 and 20 hour duration intervals. Each article exhibited outstanding lightfastness results as no appreciable discoloration was observed.

There are, of course, many alternative embodiments and modifications of the present invention which are intended to be included within the spirit and scope of this invention.

What we claim is:

1. A colorant having a single azo acetoacetanilide moiety and at least one pendant poly(oxyalkylene) chain.

2. The colorant of claim 1 conforming to the structure of Formula (I)

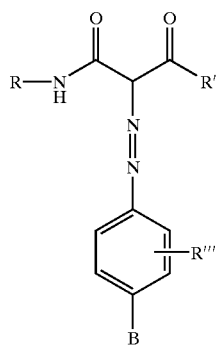

(I)

wherein R is phenyl or substituted phenyl, R' is alkyl, phenyl, or substituted phenyl, R''' is H, alkyl, alkoxy, or B, B is R"(gly)$_w$[(EO)$_x$(PO)$_y$(EO)$_z$EG]$_{n'}$, wherein EG is H or a moiety of Structure (II)

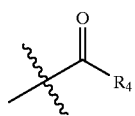

(II)

wherein $R_4$ is $C_1$–$C_{12}$ alkyl or phenyl; all wherein gly is glycidol, EO is ethylene oxide, and PO is selected from the group consisting of propylene oxide, butylene oxide, or mixtures or combinations thereof, n is 1 to 4, and wherein R" is O, N, SO$_2$, methylene, S, N(R$^5$), wherein R$^5$ is alkyl or H; wherein if R" is O or SO$_2$ then w=0 or 1, x=0–30, y=0–30, and z=0–30, wherein w+x+y+z>2, and if R" is other than O or SO$_2$, then w=0–2, x=0–30, y=0–30, and z=0–30, wherein w+x+y+z>2.

3. The colorant of claim 1 conforming to the structure of Formula (III)

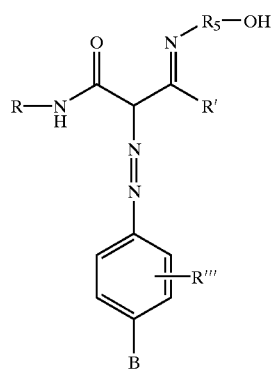

(III)

wherein R is phenyl or substituted phenyl, R' is alkyl, phenyl, or substituted phenyl, R''' is H, alkyl, alkoxy, or B, B is R"(gly)$_w$[(EO)$_x$(PO)$_y$(EO)$_z$EG]$_{n'}$, wherein EG is H or a moiety of Structure (II)

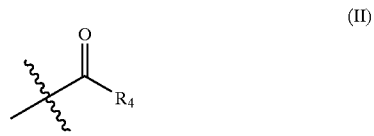

(II)

wherein $R_4$ is $C_1$–$C_{12}$ alkyl or phenyl; all wherein gly is glycidol, EO is ethylene oxide, and PO is selected from the group consisting of propylene oxide, butylene oxide, and any mixtures or combinations thereof, n is 1 to 4, and wherein R" is O, N, SO$_2$, methylene, S, N(R$_5$), wherein R$_5$ is alkyl or R$_6$—O—R$_7$, wherein R$_6$ and R$_7$ are the same or different and are each individually $C_1$–$C_4$ alkyl; wherein if R" is O or SO$_2$ then w=0 or 1, x=0–30, y=0–30, and z=0–30, wherein w+x+y+z>2, and if R" is other than O or SO$_2$, then w=0–2, x=0–30, y=0–30, and z=0–30, wherein w+x+y+z>2.

4. An article selected from the group consisting of a marker stylus, a wax formulation, a thermoplastic, and a thermoset, said article comprising the colorant of claim 1.

5. An article selected from the group consisting of a marker stylus, a wax formulation, a thermoplastic, and a thermoset, said article comprising the colorant of claim 2.

6. An article selected from the group consisting of a marker stylus, a wax formulation, a thermoplastic, and a thermoset, said article comprising the colorant of claim 3.

7. The article of claim 4 wherein said article is a thermoplastic.

8. The article of claim 7 wherein said thermoplastic selected from the group consisting of polypropylene and polyester.

9. The article of claim 5 wherein said article is a thermoplastic.

10. The article of claim 9 wherein said thermoplastic selected from the group consisting of polypropylene and polyester.

11. The article of claim 6 wherein said article is a thermoplastic.

12. The article of claim 11 wherein said thermoplastic is selected from the group consisting of polypropylene and polyester.

13. The article of claim 4 wherein said article is a thermoset.

14. The article of claim 7 wherein said thermoplastic comprises polyurethane.

15. The article of claim 5 wherein said article is a thermoset.

16. The article of claim 15 wherein said thermoplastic comprises polyurethane.

17. The article of claim 6 wherein said article is a thermoset.

18. The article of claim 17 wherein said thermoplastic comprises polyurethane.

* * * * *